July 18, 1972   R. POINTOUT ET AL   3,677,826
THREE-WAY SOLENOID-OPERATED VALVES
Filed Dec. 28, 1970   2 Sheets-Sheet 2
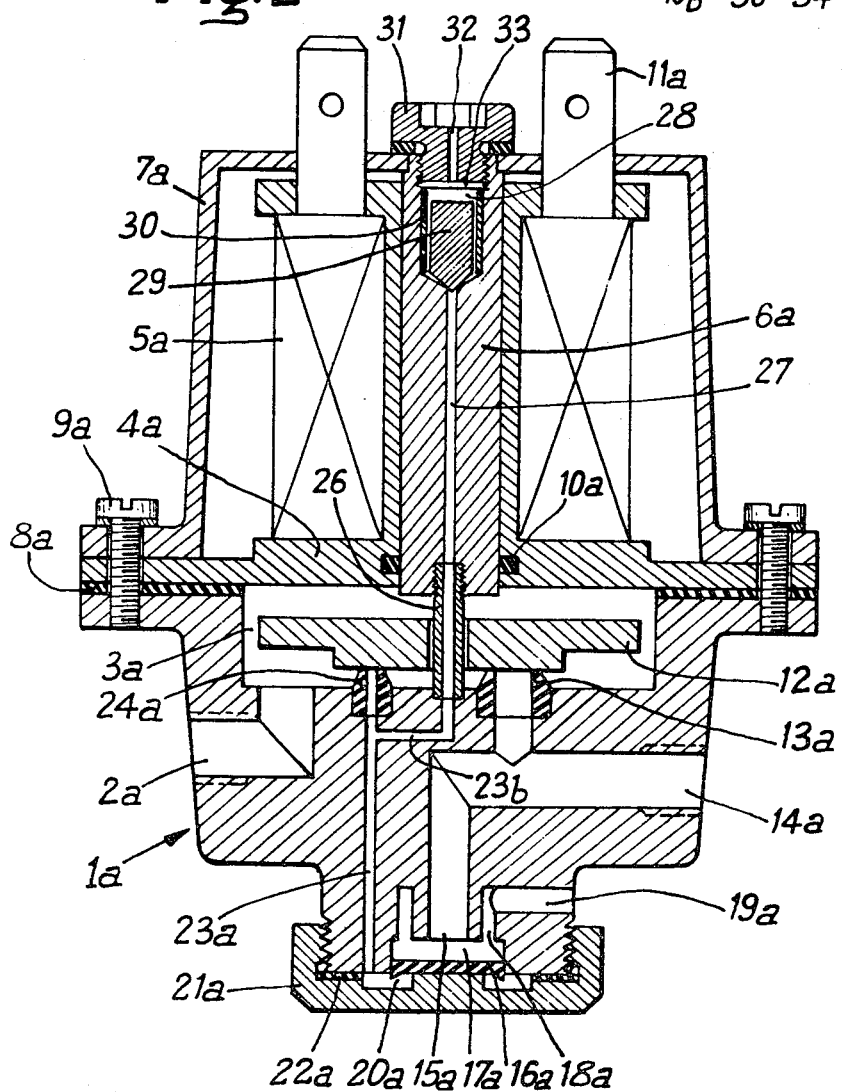

United States Patent Office 3,677,826
Patented July 18, 1972

3,677,826
THREE-WAY SOLENOID-OPERATED VALVES
Rene Pointout, 37 Rue Saint Jean; and Jacques Rouvet, 9 Rue des Plantes, both of Montlucon, France; and Adolphe Joliot, 43 Rue de Lisbonne, Paris, France
Filed Dec. 28, 1970, Ser. No. 101,463
Int. Cl. F16k 31/06
U.S. Cl. 137—596.16
10 Claims

ABSTRACT OF THE DISCLOSURE

A three-way solenoid-operated valve for distributing a fluid under pressure, simple in construction, requiring no adjustment and being highly reliable, comprising independent distributing valve and exhaust valve members, said distributing valve member closing a distributing passage under the inlet fluid pressure and opening it upon energization of said electromagnet, and said exhaust valve being adapted to be fluid-operated to closure through a control fluid passage, which is independent of said distributing passage and that said distributing valve member is adapted to open upon energization of said electromagnet, said control fluid passage communicating with a leakage passage leading to the atmosphere and permitting the opening of said exhaust valve member when said electromagnetic is de-energized, as a consequence of the closing of said control fluid passage by said distributing valve member. Said leakage passage may be formed in the magnetic circuit of the electromagnet so as to be closed by a valve plunger when said electromagnet is energized to feed a load apparatus.

---

The present invention relates to solenoid-operated valve means for distributing a fluid under pressure, of the type generally referred to as "three-way solenoid valves," such as used notably for controlling volumetric-type compressed-air apparatus or equipment, for example pneumatic actuators, these valves being installed for supplying fluid under pressure thereto or exhausting it therefrom.

Conventional solenoid-operated valves comprise a feed valve member and an exhaust valve member consisting of a pair of disk-like members associated or operatively connected to the movable assembly of the electromagnet; they are objectionable in that they require an accurate adjustment or fitting of the plays or strokes of said valve members and of the associated movable assembly during the manufacture. Moreover, the presence of sealing members of flexible material liable to distortion as a consequence of the recurrent mechanical stresses makes it necessary to periodically inspect or recondition these valves during their actual service.

Conventional solenoid-operated valves further comprise spring means and frequently the mounting of sliding members requiring sealing means and causing frictions, which should preferably be avoided.

It is the essential object of the present invention to avoid the inconveniences broadly set forth hereinabove by providing notatbly a simple valve design whereby any adjustment is definitely eliminated, whether during the manufacture or during the actual service, this valve being furthermore highly reliable. The solenoid-operated or electromagnetic valve according to this invention is also advantageous, as will be disclosed hereinafter, in that it can operate with the maximum safety with a relatively short stroke of the movable element of the electromagnet and therefore with an electromagnet power reduced accordingly, thus affording a lower power consumption.

Basically, the three-way electromagnet or solenoid-operated valve according to this invention, which comprises a body having an inlet port for the fluid under pressure, an outlet port and an exhaust port, a fluid distributing passage between the inlet port and the interconnected outlet and exhaust ports, an electromagnet, a distributing valve member adapted to close said distributing passage under the inlet fluid pressure and actuatable upon energization of said electromagnet for opening said distributing passage, and an exhaust valve member adapted to open or close said exhaust port, is characterized in that said exhaust valve is adapted to be fluid-operated to closure through a control fluid passage, which is independent of sad distributing passage and that said distributing valve member is adapted to open upon energization of said electromagnet, said control fluid passage communicating with a leakage passage leading to the atmosphere and permitting the opening of said exhaust valve member when said electromagnet is de-energized, as a consequence of the closing of said control fluid passage by said distributing valve member.

According to another feature constituting a further improvement of the invention set forth hereinabove, said leakage passage is formed in the magnetic circuit of the electromagnet and another valve member responsive to the magnetic pull is provided for closing said leakage passage when the electromagnet is energized, that is, during the supply of fluid to the load apparatus.

Two typical forms of embodiment of the solenoid-operated three-way valve according to this invention will now be described by way of illustration with reference to the accompanying drawing, in which:

FIG. 2 is a similar view showing a modified form of embodiment thereof, and

FIG. 3 is a detail view showing a specific arrangement of the exhaust valve member.

Figure 1:
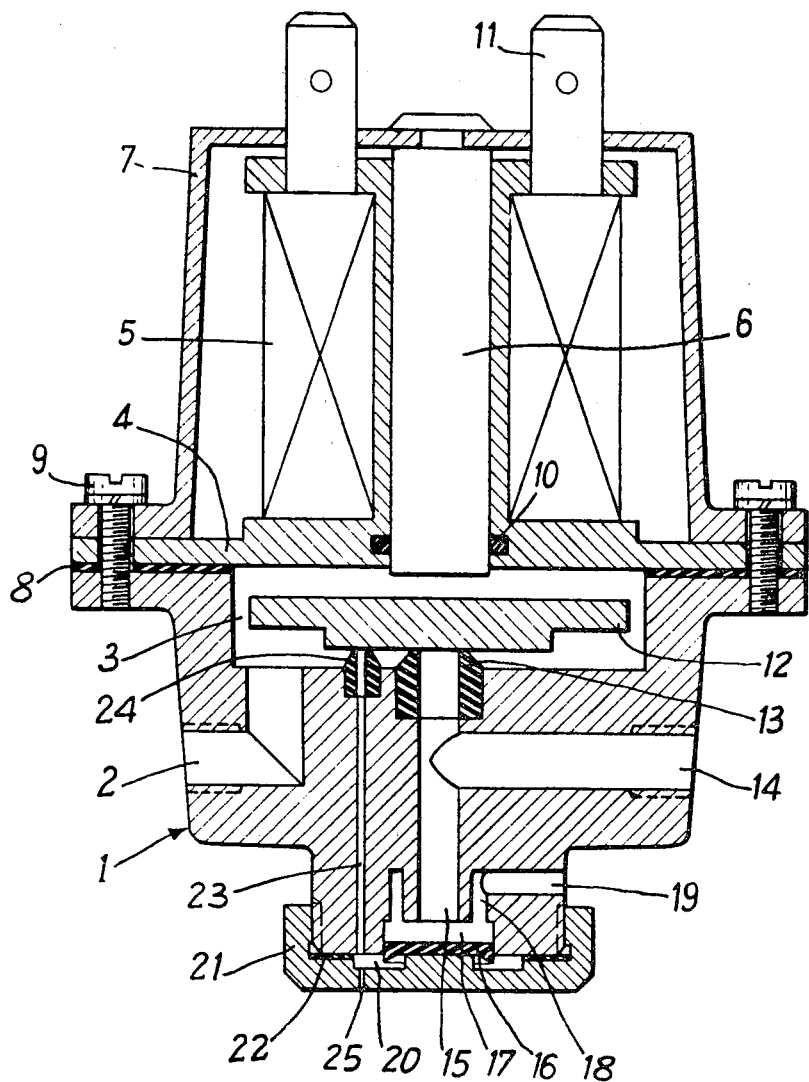
FIG. 1 is an axial section showing a first form of embodiment of the valve of this invention.

The solenoid-operated valve illustrated in FIG. 1 comprises a body 1 in which an inlet port 2 is communicating with a chamber 3 formed in the body 1 and adapted to be closed by a flange 4 supporting the coil winding 5 of an electromagnet. This electromagnet comprises a fixed magnetic core 6, the coil consisting of non-magnetic material.

The electromagnet further comprises a yoke 7 of magnetic material secured to the body 1 together with the coil flange 4, a suitable gasket 8 being interposed between said body and flange, and the assembly being clamped by screws 9. Furthermore, the core 6 is rigid with the yoke and sealed within the coil due to the provision of an O-ring 10. The terminals 11 of winding 5 extend through corresponding passages formed in the top of yoke 7.

Freely mounted in chamber 3 is a distributing valve member 12 consisting of a suitable magnetic material, constituting the movable member of the electromagnet, and co-acting with a distributing passage surrounded by a seat 13 consisting of a ring of suitable resilient material fitted in a corresponding recess of said body 1; this distributing passage communicates with an outlet port 14 and also with an exhaust port 15 of the electromagnetic valve. This exhaust port 15 opens into another chamber formed in the body 1 and receiving an exhaust valve member in the form of a disk 16 forming two compartments, i.e. a compartment 17 above this disk 16, which communicates with the exhaust passage 15, and a concentric cavity 18 surrounding said passage 15 and communicating through a plurality of radial holes such as 19 with the surrounding atmosphere. The other compartment 20 is formed mainly in a tapped plug 21 closing said valve chamber and screwed on the threaded lower end of body 1 with the interposition of a sealing gasket 22. A passage 23 for the fluid controlling the valve member 16 opens into this compartment 20 and comprises to this end a fluid inlet seat 24 opening into the chamber 3 and engageable by said distributing valve member 12. This auxiliary seat 24 consists of a ring of resilient material fitted in a corresponding recess formed in said body under said distributing valve member. A third similar ring (not shown) is disposed likewise in chamber 3 in order to constitute with the ring-seats 13 and 24 a three-legged bearing imparting a reliable stability to valve member 12 when it coacts with said seats.

Compartment 20 further communicates with the atmosphere via a small orifice 25, having a cross-sectional passage area considerably smaller than that of passage 23 and seat 24 for a purpose to be described presently.

The above-described electromagnetic valve operates as follows:

Let us assume that port 2 is connected to a source of compressed air and port 14 to a load apparatus, with the solenoid valve in its inoperative position as shown in the drawing, i.e. with electromagnet 5 de-energized and valve member 12 bearing on seat rings 24 and 13 with a force subordinate to the fluid pressure prevailing in chamber 3 and also to the seats cross-section. The load apparatus is thus vented to the atmosphere via exhaust port 15 opened by valve disk 16 as will be explained presently.

Energizing the electromagnet is attended by the supply of fluid under pressure but the first consequence of this energization is of course the attraction of valve member 12 by core 6.

The unseating of valve member 12 permits the ingress of compressed air through seat 13 to outlet port 14 and exhaust port 15, and also through seat 24 to compartment 20 wherein the valve disk 16 is subjected to an air pressure overcoming the transitory pressure produced in chamber 17 which is connected to the atmosphere through passages having a greater cross-sectional area than passage 25, whereby the valve disk 16 will close the exhaust passage 15 and keep same in this closed condition due to the pressure differential; under these conditions, the load apparatus will be supplied with compressed air as long as the coil 5 is energized.

When the energization is cut-out, valve member 12 drops and resumes its seated position on the ring seats 13, 24, while compartment 20 remaining connected to the atmosphere via passage 25 releases valve disk 16 and the latter opens as soon as the residual pressure in this compartment becomes inferior to the feed pressure exerted on the cross-section of exhaust passage 15 closed by this valve disk; thus, the apparatus is vented to the atmosphere via annular passage 18 and radial orifices 19.

An exhaust opening time-lag may be obtained through pneumatic means, the relevant parameters consisting in this case of the volume of compartment 20 and the leakage cross-sectional area, in this case of fixed value, obtained through passage 25, but this value may be made variable by resorting to suitable and known exhaust regulating means.

It will be noted that as the distributing valve member 12 and valve disk 16 are independent of each other no adjustment is required. The stroke of valve member 12 may if desired be selected to have the value just necessary to ensure the desired output flow through seat 13 without making any allowance for the exhaust valve as required in conventional valve structures comprising operatively interconnected valve member; this characteristic feature is of particular importance from the point of view of the choice of the electromagnet and the power consumption of the solenoid-operated valve. Moreover, such a solenoid valve construction permits a particularly simple design and the body 1 can be moulded from any suitable material; besides, the mounting of valve member 12 and valve disk 16 is extremely simple as it consists simply in assembling the electromagnet with the body 1 and fitting the plug 21 to the bottom or lower end of this body. Furthermore, replacing the valve disk 16 is also a very easy operation.

However, in this form of embodiment the leakage passage 25 for the control fluid may be considered as objectionable in certain applications utilizing an air reservoir of limited capacity, notably on automotive or other vehicles, especially if one or a plurality of solenoid-operated valves of this type must remain in their open position when the vehicle is at a standstill, for this would obviously cause the compressed-air reservoir to be exhausted after a relatively short time.

FIG. 2 illustrates a form of embodiment of the solenoid-valve of this invention which is intended to eliminate this permanent leakage of the control fluid during the time periods in which the distributing valve remains open.

In FIG. 2 the component elements similar to those shown in FIG. 1 are designated by the same reference numerals but completed by the index "a."

In this modified form of embodiment the leakage passage 25 is eliminated and passage 23a comprises a branch section 23b connected in a fluid-tight manner, in relation to chamber 3a, through a tubular member 26, to a central passage 27 formed coaxially in core 6a. This tubular member 26 consists of non-magnetic metal and extends freely through the main valve member 12a. In this form of embodiment the tubular member 26 has its upper end screwed in the lower portion of core 6a and its lower end fitted and glued in a corresponding shallow recess formed in the valve body 1a.

At the opposite end of core 6a the axial passage 27 opens into a concentric but larger recess 28 in which a plunger valve member 29 of magnetic metal is adapted to close the upper end of passage 27 when the electromagnet is energized; in this form of embodiment the plunger 29 is slidably mounted with play in a lining 30 of non-magnetic material forming an insert in said recess 28. The clearance thus left between the valve 29 and insert 30 provides an air passage. A screw plug 31, preferably of non-magnetic material, provided for assembling the yoke 7a and the core 6a, closes the recess 28 but connects same to the atmosphere through an orifice 32 and a slot 33.

This modified form of embodiment of the solenoid-valve according to his invention operates as follows:

The valve is shown in its inoperative position; in other words, it connects the load apparatus to the exhaust as in the preceding case.

Energizing the electromagnet is attended by the magnetic attraction of valve member 12a against the core 6a and also by the closing of axial passage 27 by the upper plunger valve 29.

The seats 13a and 24a are open and as in the preceding form of embodiment the differential pressure will close the valve 16a and therefore the exhaust passage 15a; under these conditions, the load apparatus will be supplied with fluid under pressure as long as the electromagnet is energized, without producing any control air leakage as observed in the preceding form of embodiment.

When the electromagnet is de-energized, the main valve member 12a is re-seated on rings 24a and 13a, and the axial passage 27 is open to the surrounding atmosphere due to the air pressure unseating the plunger valve 29 (air leak through recess 28 and orifice 32). Chamber 20a is thus vented to the atmosphere and the free valve disk 16a is opened as already mentioned, so that the load apparatus is also connected to the exhaust.

A time-lag effect may be obtained pneumatically as in the preceding case and made variable by replacing the plug 31 by an exhaust control device.

As illustrated in FIG. 3, the exhaust valve disk assembly 16b may consist of a diaphragm 34 formed with a peripheral bead 35 fitted in a corresponding groove formed in the valve chamber; this diaphragm has its central portion stiffened by an adhesive metal disk 36.

Although an exhaust valve member responsive to a pressure differential has been preferred on account of its greater simplicity of design, it will readily occur to those conversant with the art that it would not constitute a departure from the present invention to provide any other type of exhaust valve actuated to closure by control fluid as a consequence of the opening of the distributing valve, and notably and alternatively to provide a piston-type exhaust valve member, that is, a valve member movable across the exhaust passage and urged to its open position by spring means counteracting the pressure of the control fluid.

Of course, many other modified forms of embodiment and variations may be contemplated without departing from the scope of the invention as set forth in the appended claims.

What is claimed as new is:

1. A three-way solenoid-operated valve comprising a body having an inlet port for a fluid under pressure, an outlet port and an exhaust port, a fluid distributing passage between said inlet port and the interconnected outlet and exhaust ports, an electromagnet, a distributing valve member closing the distributing passage under the inlet fluid pressure and actuatable upon energization of said electromagnet for opening said distributing passage, and an exhaust valve member adapted to open or close said exhaust port, wherein a control fluid passage, which is independent of said distributing passage and that said distributing valve member is adapted to open upon energization of said electromagnet, is provided for fluid-operating said exhaust valve member to closure, and wherein a leakage passage leading to the atmosphere is communicating with said control fluid passage for permitting the opening of said exhaust valve member when said electromagnet is de-energized, as a consequence of the closing of said control fluid passage by said distributing valve member.

2. Valve according to claim 1, characterized in that said leakage passage is formed in the magnetic circuit of the electromagnet and that a valve member responsive to the magnetic pull is provided for closing said leakage passage when said electromagnet is energized.

3. Valve according to claim 2, comprising a core-type electromagnet, characterized in that said leakage passage extends coaxially through said core and that the valve member closing said passage consists of a plunger mounted for free axial movement in said core.

4. Valve according to claim 3, compriing an electromagnet and a valve body mounted to one end of said electromagnet, characterized in that said leakage passage formed in said core is connected to said valve body through a tubular member, said distributing valve member being mounted freely about said tubular member.

5. Valve according to claim 1, comprising a fixed-core electromagnet with a movable member responsive to the core pull, characterized in that said movable member of said electromagnet constitutes said distributing valve member in the form of a free valve disposed in a chamber formed between the electromagnet and the valve body, said free valve being adapted to engage ring-shaped seats of elastomeric material disposed at the relevant ends of the distributing passage and control fluid passage.

6. Valve according to claim 1, characterized in that said exhaust valve member is a free valve member urged to its open position by the fluid pressure prevailing in the exhaust passage.

7. Valve according to claim 6, characterized in that said exhaust valve member bounds in the valve body a compartment, said exhaust port opening into said compartment in front of said valve, and that a passage connected to the atmosphere extends and opens concentrically to said exhaust port into the bottom of said compartment.

8. Valve according to claim 7, characterized in that said exhaust valve consists of a diaphragm having a peripheral bead fitted in a groove formed in a valve chamber, the central portion of said diaphragm being stiffened by a rigid disk.

9. Valve according to claim 1, characterized in that said exhaust valve member is mounted in a chamber formed between the valve body and a fluid-tight plug adapted to be screwed to said body.

10. Valve according to claim 1, characterized in that the volume of the control fluid passage to said main valve and said leakage passage of said control fluid passage are calculated to produce a pneumatic time-lag between the closing of said distributing valve member and the opening of said exhaust valve member.

References Cited
UNITED STATES PATENTS

| | | | |
|---|---|---|---|
| 2,358,828 | 9/1944 | Ray | 251—141 X |
| 2,984,257 | 5/1961 | McCormick et al. | 137—596.16 X |
| 3,038,500 | 6/1962 | Lansky et al. | 137—596.16 X |
| 3,303,854 | 2/1967 | Churchill | 137—625.65 |

M. CARY NELSON, Primary Examiner

D. R. MATTHEWS, Assistant Examiner

U.S. Cl. X.R.

251—30